Jan. 16, 1968     B. H. BROWN     3,363,476
WING PULLEY
Filed June 3, 1966
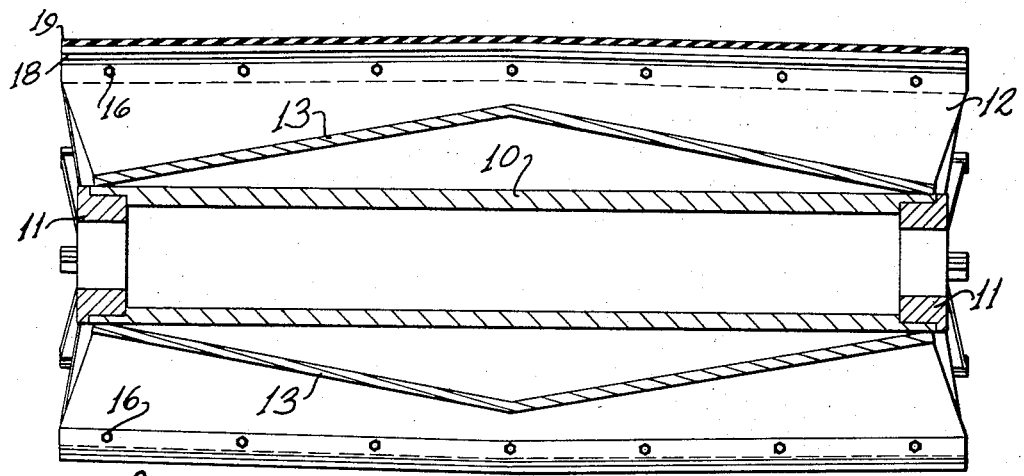
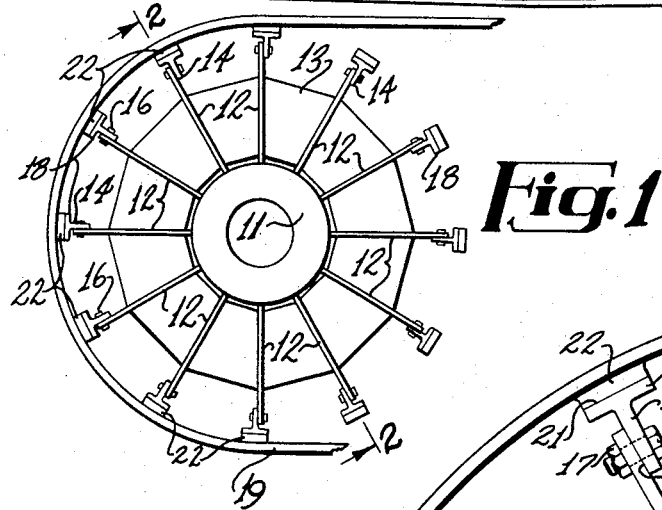
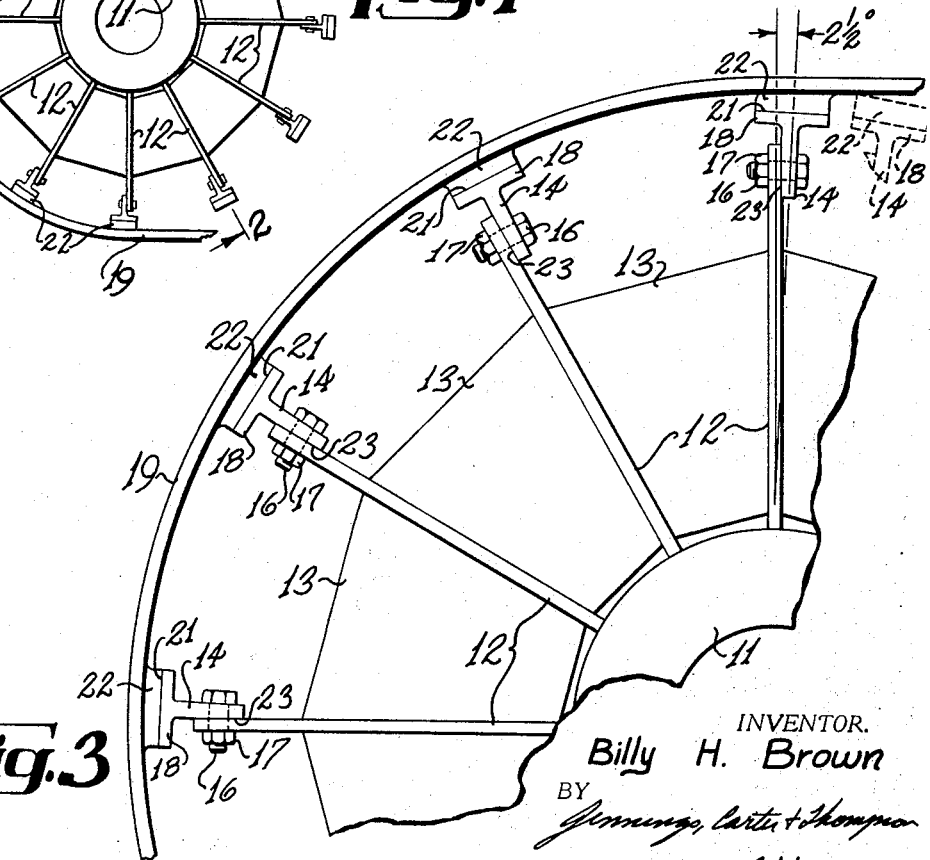
INVENTOR.
Billy H. Brown
BY
Attorneys

United States Patent Office 3,363,476
Patented Jan. 16, 1968

3,363,476
WING PULLEY
Billy H. Brown, Winfield, Ala., assignor to Continental Conveyor & Equipment Company, a corporation of Alabama
Filed June 3, 1966, Ser. No. 555,159
5 Claims. (Cl. 74—230.6)

This invention relates to a wing pulley for a flat belt, such as conveyor belts and the like and more particularly to such a pulley which shall include improved means for breaking up and removing foreign particles from the adjacent inner surface of the belt.

An object of my invention is to provide a wing pulley of the character designated which shall include means engageable with the belt for increasing traction between the pulley and the belt.

A further object of my invention is to provide a wing pulley of the character designated in which there are no sharp or irregular metal surfaces in position to engage the belt alongside the resilient belt engaging members.

A still further object of my invention is to provide a wing pulley of the character designated which shall be extremely simple of construction and manufacture and one which includes improved means for removing the belt cleaning and gripping units from the radially extending wing-like members, thus greatly reducing the time and cost of maintaining the pulley in proper operating condition.

As is well known in the art to which my invention relates, difficulties have been encountered in maintaining wing-type pulleys. While resilient bars have been mounted at the ends of radially extending wing-like members, no effective means have been provided to prevent excessive wear to the belt upon wear of the resilient bars. That is to say, the resilient bars have been supported in channel-like retainer members, as disclosed in the Van Gorp Patent No. 3,046,805. Such channel-like members are unsatisfactory for holding worn resilient bars. That is, as the resilient bars become worn, the belt engages the relatively sharp, exposed edges located outwardly of and alongside the resilient bars whereby the belt is damaged. Accordingly, the resilient bars must be replaced often by removal of the entire pulley assembly.

To overcome the above mentioned difficulties, I provide a belt cleaning and gripping unit which comprises an elongated member detachably mounted adjacent the outer end of a radially extending wing-like member. An elongated bar is carried by the outer side of the elongated member and extends transversely of and generally parallel to the inner surface of the belt. The elongated bar is provided with a relatively flat outer surface and bonded to this surface is an elongated resilient member which is substantially rectangular, as viewed in cross section. The elongated resilient member is of a width equal substantially the width of the elongated bar whereby there are no exposed, irregular surfaces outwardly of and alongside the resilient member.

A wing pulley embodying features of my invention is illustrated in the accompanying drawing, forming a part of this application, in which:

FIG. 1 is an end elevational view of the wing pulley, showing the belt broken away;

FIG. 2 is a sectional view taken generally along the line 2—2 of FIG. 1; and,

FIG. 3 is an enlarged, fragmental view showing in dotted lines the initial contact point between the resilient member and the inner surface of the belt.

Referring now to the drawing for a better understanding of my invention, the pulley comprises an elongated tubular member 10 having hub members 11 adjacent opposite ends thereof as shown in FIG. 2. Projecting outwardly and radially from the tubular member 10 are a plurality of angularly spaced wing-like members 12. To reinforce and stabilize the wing-like members 12, suitable gusset plates 13 are mounted between adjacent pairs of wing-like members 12.

Detachably mounted adjacent the outer end of each of the radially extending wing-like members 12 is an elongated member 14. Preferably, the elongated member 14 is removably connected to the wing-like member 12 by suitable retaining bolts 16 having nuts 17. An elongated bar 18 is carried by the outermost side of the elongated member 14 in position to extend transversely of and generally parallel to the inner surface of a flat belt indicated generally at 19. Preferably, the elongated bar 18 is formed integrally with the elongated member 14 to define an elongated composite member which is generally T-shaped, as viewed in cross section. The elongated bar 18 is provided with a relatively flat, smooth outer surface 21, as shown in FIG. 3.

Bonded to the outer surface of the elongated bar 18 is an elongated resilient member 22 which is substantially rectangular, as viewed in cross section and in end elevation, as shown in FIG. 3. The elongated resilient member 22 is of a width equal substantially the width of the elongated bar 18, as shown. Accordingly, there are no projections or irregular surfaces outwardly of and alongside the elongated resilient member 22.

As shown in FIG. 3, the outer surface of the elongated bar 18 and the outer surface of the elongated resilient member 22 are inclined outwardly and forwardly in the direction of rotation of the pulley to define an obtuse included angle with the radially extending wing-like member 12. Accordingly, upon rotation of the pulley, the leading edge of the resilient member 22 first exerts pressure against the inner surface of the belt 19. Pressure is then exerted progressively from the leading edge to the trailing edge of the resilient member 22 whereby the resilient member is distorted and deflected against the adjacent, inner surface of the belt 19 to thus break up and wipe foreign particles from the adjacent inner surface of the belt. Preferably, the outer surface of the elongated bar 18 and the outer surface of the resilient member 22 carried thereby are inclined approximately 2½ degrees from a perpendicular position relative to the wing-like member 12, as shown in FIG. 3. This inclination of the outer surface of the elongated bar 18 and resilient member 22 may be obtained by providing an inwardly tapered surface 23 alongside the elongated member 14 in position to engage the adjacent flat surface of a wing-like member 12. Preferably, the elongated resilient member 22 is formed of a rubber-like material which is vulcanized to the elongated bar 18.

From the foregoing description, the operation of my improved wing pulley will be readily understood. The elongated members 14 are detachably connected to the wing-like members 12 by the retaining bolts 16 whereby selected ones of the elongated members 14 may be removed without disassembling the entire pulley and without removal of the belt. The inwardly tapered surface 23 of the elongated member 14 engages the adjacent flat surface of the wing-like member 12 whereby the outer surface of the elongated bar 18 and the outer surface of the resilient member 22 are inclined outwardly and forwardly in the direction of rotation whereby, upon rotation of the pulley, pressure is first exerted against the leading edge of the resilient member 22, as shown in dotted lines in FIG. 3. Force is then exerted progressively from the leading edge to the trailing edge of the resilient member 22 to thus distort and deflect the resilient member 22 against the adjacent inner surface of the belt 19 to break up and wipe foreign particles therefrom.

From the foregoing, it will be seen that I have devised an improved wing-type pulley which not only maintains the inner surface of the belt in a clean condition at all times but also provides traction between the pulley and the belt. Also, by providing cleaning and gripping units which are detachably connected to outer portions of the radially extending wing-like members, an individual unit may be removed by merely releasing the retaining bolts 16, thus greatly reducing the time and effort required in maintaining the pulley in satisfactory working order at all times.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

I claim:

1. In a pulley for a flat belt and having at least one radially extending wing-like member, a belt cleaning and gripping unit comprising:
   (a) an elongated member detachably mounted adjacent the outer end of said radially extending wing-like member,
   (b) an elongated bar carried by the outer side of said elongated member and extending transversely of and generally parallel to the inner surface of said belt,
   (c) said elongated bar having a relatively flat outer surface, and
   (d) an elongated resilient member substantially rectangular as viewed in cross section bonded to the outer surface of said elongated bar and being of a width equal substantially the width of said elongated bar.

2. In a pulley as defined in claim 1 in which said elongated member is formed integrally with said elongated bar to define a T-shaped member as viewed in cross section.

3. In a pulley as defined in claim 1 in which said elongated resilient member is a rubber-like member vulcanized to said elongated bar.

4. In a pulley as defined in claim 1 in which the outer surface of said elongated bar and the outer surface of said elongated resilient member are inclined outwardly and forwardly in the direction of rotation to define an obtuse included angle with said radially extending wing-like member to exert pressure first against the leading edge of said resilient member and then exert pressure progressively from said leading edge to the trailing edge of said resilient member whereby said resilient member is distorted and deflected against the adjacent surface of the belt to break up and wipe foreign particles from said adjacent surface of the belt.

5. In a pulley as defined in claim 4 in which the outer surface of said elongated bar and the outer surface of said elongated resilient member are inclined approximately 2½ degrees from a perpendicular position relative to said wing-like member.

References Cited

UNITED STATES PATENTS

| | | | |
|---|---|---|---|
| 3,046,805 | 7/1962 | Van Gorp | 74—230.7 |
| 3,220,272 | 11/1965 | Beausoleil | 74—230.6 |

FRED C. MATTERN, JR., *Primary Examiner.*

J. A. WONG, *Assistant Examiner.*